US007400322B1

(12) United States Patent
Urbach

(10) Patent No.: US 7,400,322 B1
(45) Date of Patent: Jul. 15, 2008

(54) VIEWPORT-BASED DESKTOP RENDERING ENGINE

(76) Inventor: Julian Michael Urbach, 5025 Bluebell Ave., Valley Village, CA (US) 91607

( * ) Notice: Subject to any disclaimer, the term of this patent is extended or adjusted under 35 U.S.C. 154(b) by 155 days.

(21) Appl. No.: 11/166,661

(22) Filed: Jun. 23, 2005

Related U.S. Application Data

(60) Provisional application No. 60/583,182, filed on Jun. 24, 2004.

(51) Int. Cl.
  *G06T 15/00* (2006.01)
  *G09G 5/00* (2006.01)
(52) U.S. Cl. ..................... 345/419; 345/623
(58) Field of Classification Search ............ 345/420, 345/419, 620, 622, 623
  See application file for complete search history.

(56) References Cited

U.S. PATENT DOCUMENTS 5,268,677 A * 12/1993 Frasier et al. ............... 345/623

5,734,808 A * 3/1998 Takeda ....................... 345/419

OTHER PUBLICATIONS

Gallagher, Computer Visualization, CRC Press, 1995, pp. 122-126.*

* cited by examiner

*Primary Examiner*—Ryan R Yang
(74) *Attorney, Agent, or Firm*—Mark James Spolyar

(57) ABSTRACT

Methods, apparatuses and systems directed, in one implementation, to a system of dynamically spawned, virtual, three-dimensional (3D) viewports which render transparently within the elements of, or on top of, an existing desktop display environment, allowing rendered objects to seamlessly interact and move between different 3-dimensional viewport spaces and the two-dimensional (2D) screen space of the desktop environment. The present invention, in one implementation, renders multiple 3-dimensional viewports and free floating 3-dimensional objects on the client desktop, seamlessly mixed into the normal event and rendering pipeline of the computing device's 2-dimensional screen aligned desktop and windowed environment.

16 Claims, 7 Drawing Sheets

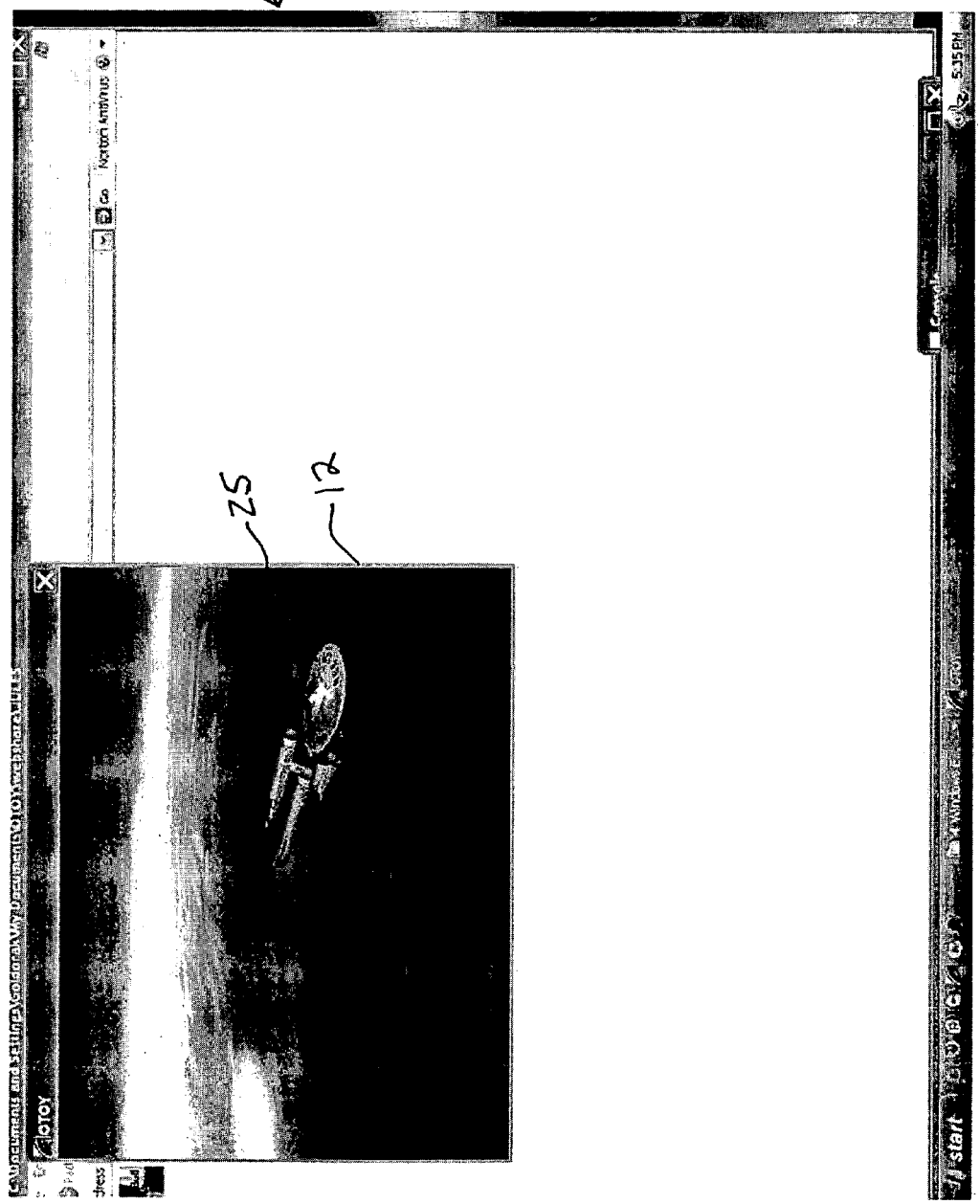

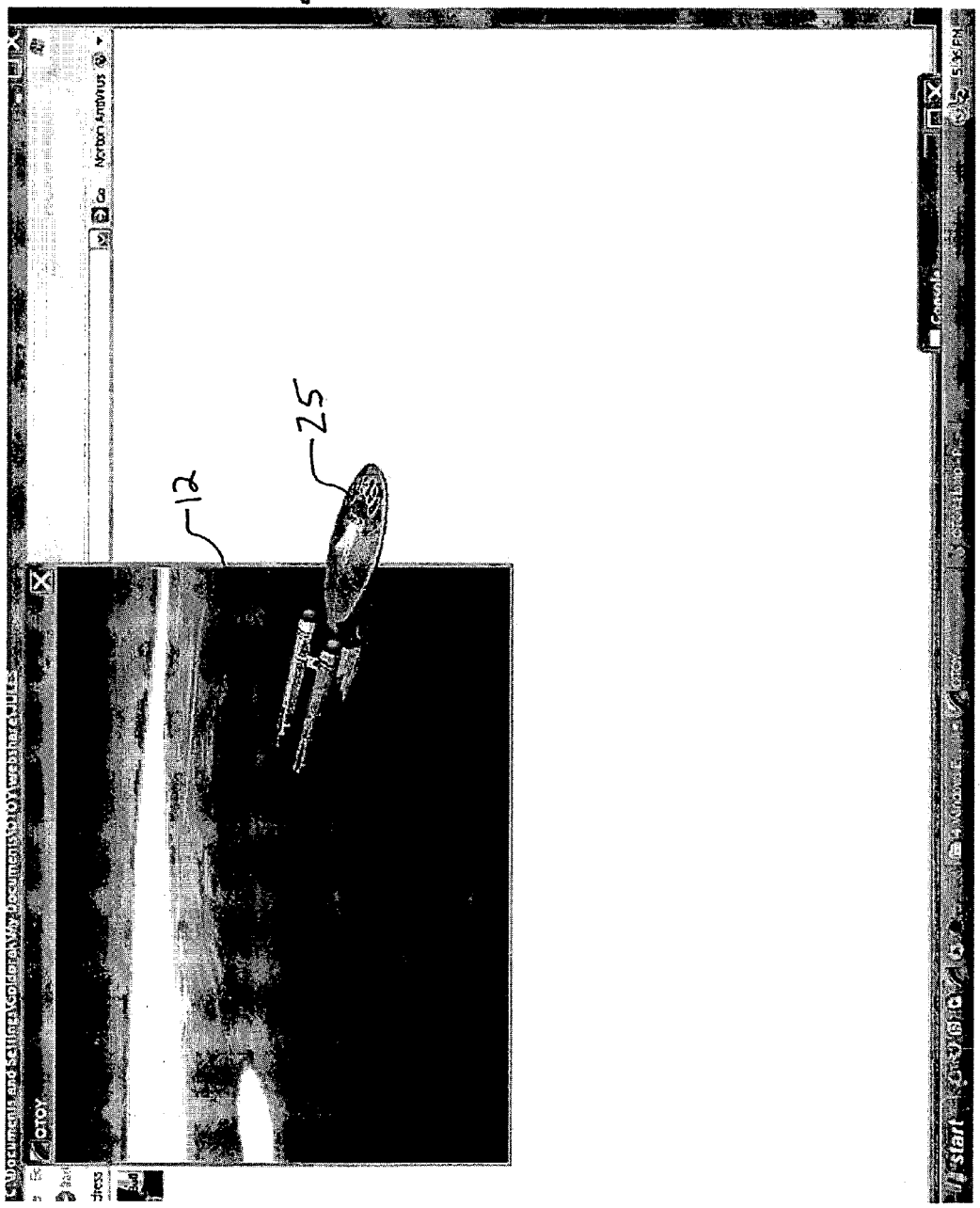
Fig._2

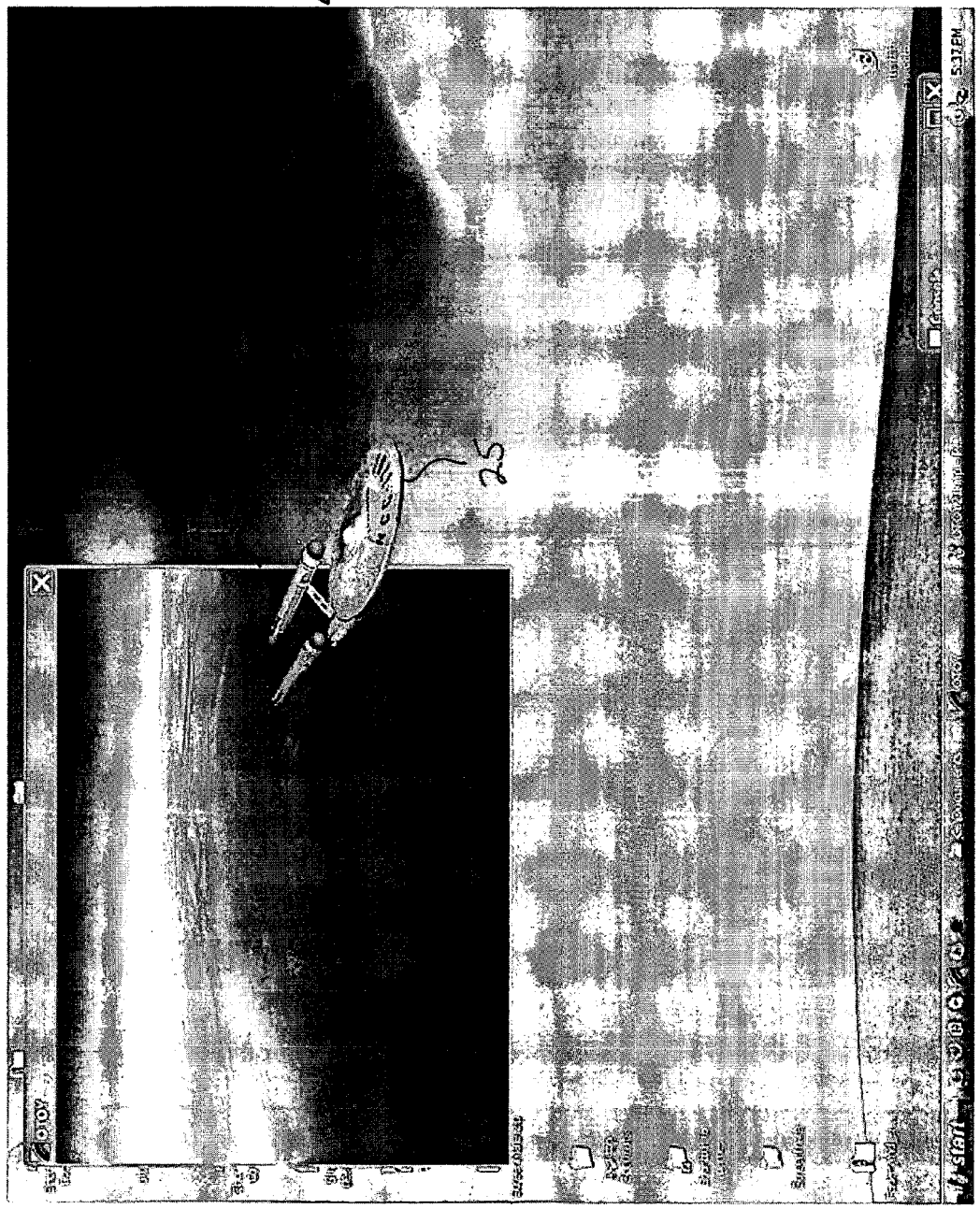
Fig._3

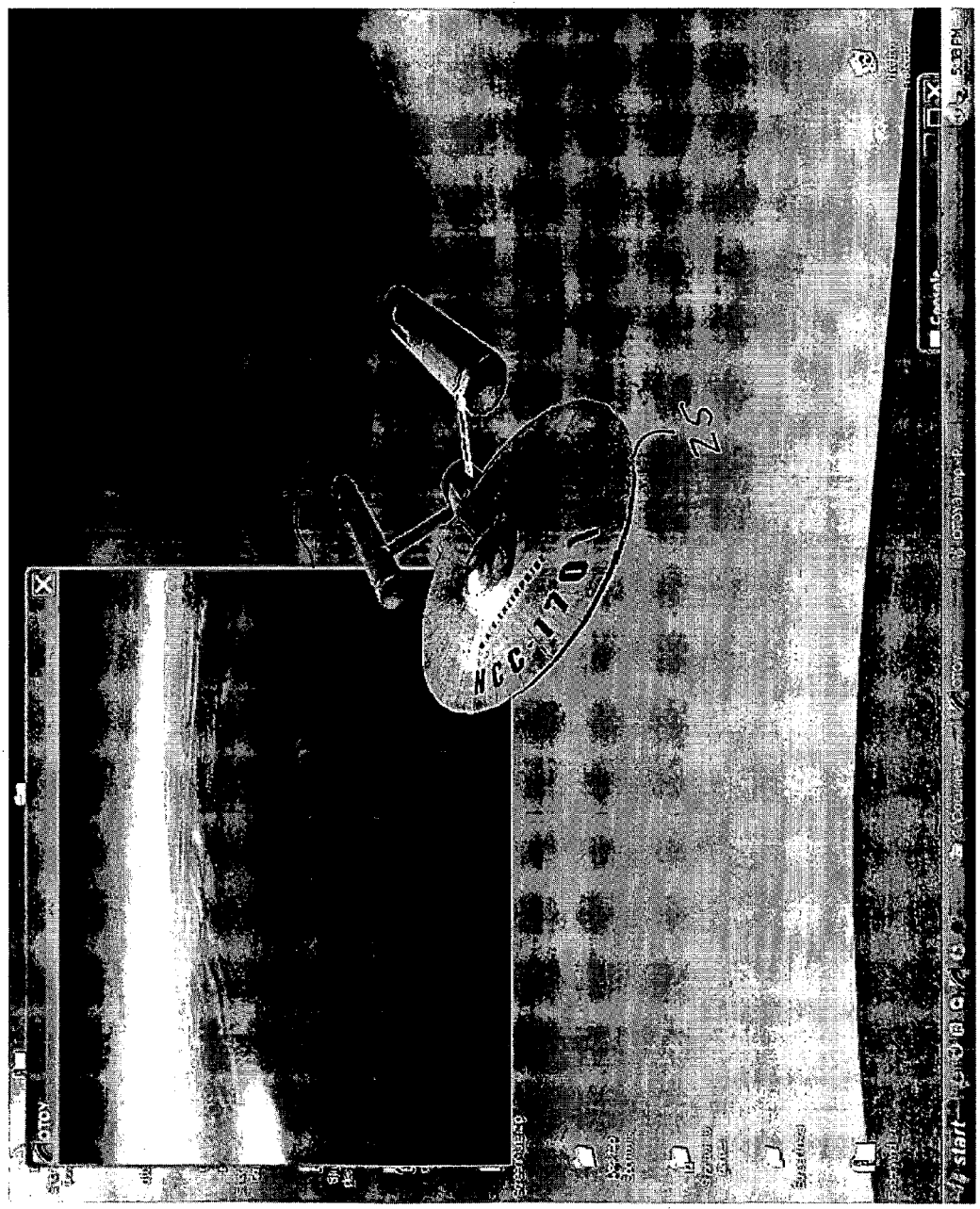
Fig._4

VIEWPORT-BASED DESKTOP RENDERING ENGINE

CROSS-REFERENCE TO RELATED APPLICATIONS

The present application claims priority from U.S. provisional patent application Ser. No. 60/583,182 filed Jun. 24, 2004, which is incorporated herein by reference for all purposes.

FIELD OF THE INVENTION

The present invention relates to computer graphics, display, user interface, and rendering technologies and, more particularly, to methods, apparatuses and systems directed to integration of rendered 3-dimensional images within 2-dimensional desktop or other display environments.

BACKGROUND OF THE INVENTION

The paradigm of the modern GUI operating system on computing devices, such as a PC, has remained largely unchanged from the basic framework introduced 20 years ago. That is, the graphical representation of data, functions and references within sorted, layered and clipped regions are projected orthogonally onto 2-dimensional screen space. Similarly, cursor location, dragging, clicking, resizing, layering and scrolling are fixed within the 2-dimensional coordinate plane. Accordingly, when a user ordinarily observes or works in 3-dimensional virtual space executed on a computing device, it is almost ubiquitously in the context of something completely separate from the above functions of the operating system and desktop, and limited within the window of an application, such as a game or 3-dimensional modeling program, with no established interoperability between the 3-dimensional space of such an application and the two-dimensional, screen-aligned elements of the desktop. Three-dimensional file browsers and shells currently exist (for example, win3-dimensional, Microsoft Task Library, Sphere3-dimensional). These prior efforts, however, have sacrificed the simplicity and natural intuitiveness of flat 2-dimensional screen space as well as interoperability with legacy 2-dimensional applications and system elements (Microsoft Task Library, for example, required a special version of Windows 2000 to be built in order to render running applications and desktop windows).

In light of the foregoing, a need in the art exists for methods, apparatuses and systems directed to 3-dimensional imaging and computing applications, such as gaming, computer-assisted modeling, and advertising, with enhanced rendering of three-dimensional objects, and integration with desktop display environments, including 2-dimensional and 3-dimensional display environments.

SUMMARY OF THE INVENTION

The present invention provides methods, apparatuses and systems directed, in one implementation, to a system of dynamically spawned, virtual three-dimensional (3D) viewports which render transparently within the elements of, or on top of, an existing desktop or other display environment, allowing rendered objects to seamlessly interact and move between different 3-dimensional viewport spaces and the underlying display environment, which can be a two-dimensional (2D) screen space, or a 3-dimensional rendered space with depth information. The present invention, in one implementation, renders multiple 3-dimensional viewports and free floating 3-dimensional objects on the client desktop, seamlessly mixed into the normal event and rendering pipeline of the computing device's 2-dimensional screen aligned desktop and windowed environment. The present invention can be applied in a variety of contexts including interactive systems—such as, computer gaming systems, three-dimensional graphical user interfaces, etc.—or passive systems, such as multi-media presentations, animations, and the like. The present invention also has application to stand-alone computing devices, or networked computing systems. These and other objects of the present invention will become apparent from the drawings and following description.

DESCRIPTION OF THE DRAWINGS

FIG. 1 illustrates a desktop environment including a viewport containing a 3-dimensional object rendered therein.

FIG. 2 illustrates a desktop environment where a 3-dimensional object has crossed a clipping surface associated with a viewport and is rendered against the context of the desktop.

FIG. 3 provides an additional view of a desktop environment where a 3-dimensional object has crossed a clipping surface associated with a viewport and is rendered against the context of the desktop.

FIG. 4 provides another view of a desktop environment where a 3-dimensional object has crossed a clipping surface associated with a viewport and is rendered against the context of the desktop.

DESCRIPTION OF PREFERRED EMBODIMENT(S)

Figure 5A:
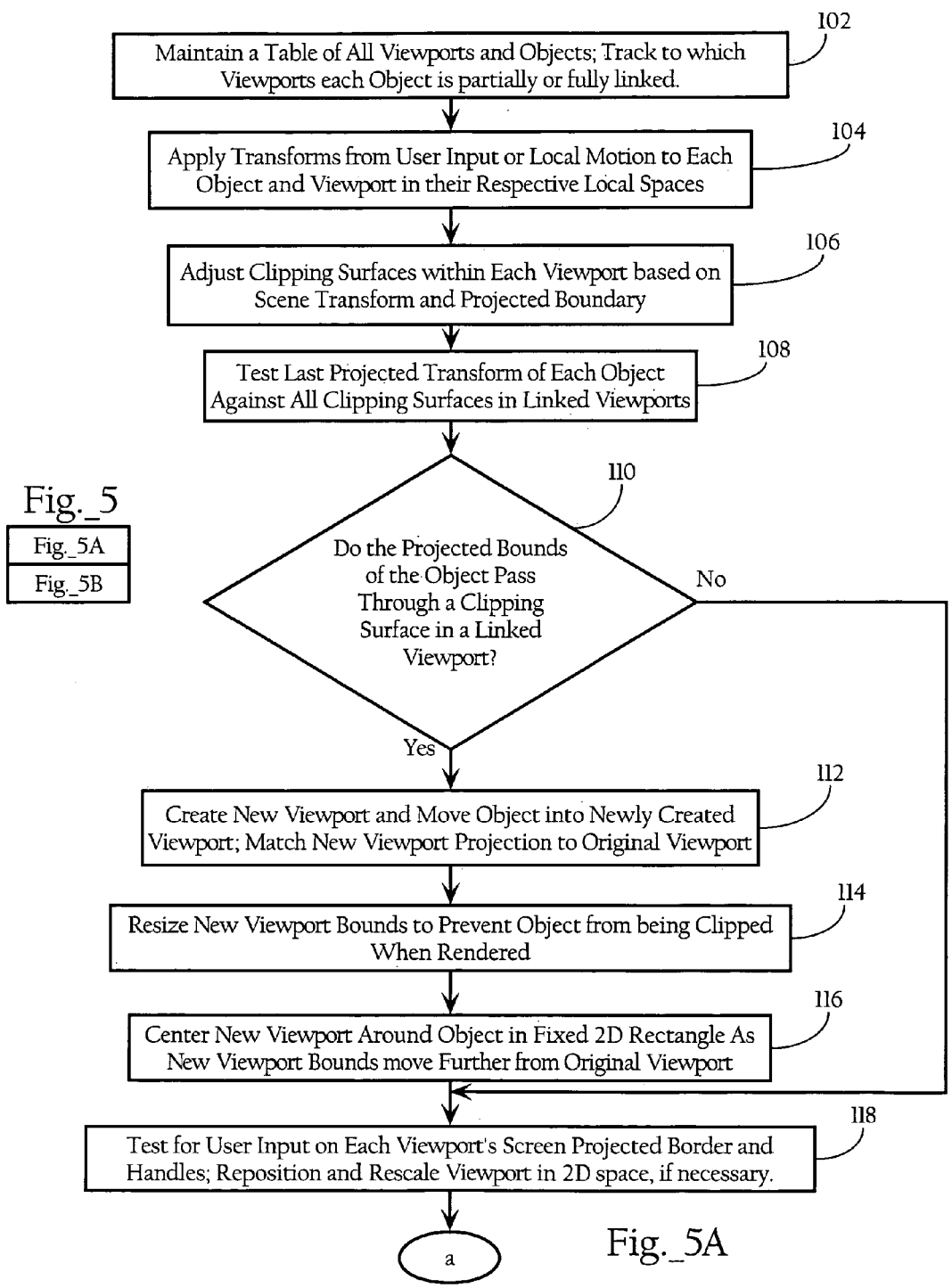
FIG. 5 is a flow chart diagram illustrating a method, according to one implementation of the present invention, directed to the selective rendering of a 3-dimensional object based on its location relative to one or more clipping surfaces.

As described herein, the viewport-based desktop rendering system can be configured to accomplish a variety of functions and can operate within the context of myriad applications, such as games, multimedia presentations, advertisements and the like. In one implementation, the present invention allows for display of a rendered 3-dimensional image within the context of a 2-dimensional desktop environment. In another implementation, the present invention allows a rendered 3-dimensional object to seamlessly transition between a window including a rendered 3-dimensional image and the 2-dimensional desktop environment. In one implementation, the present invention provides a rendering engine that integrates 3-dimensional portal windows with the 2-dimensional desktop environment. In one implementation, the rendering engine is a software application executed on a general-purpose computer. The rendering engine may be implemented in a variety of forms. For example, it may be distributed as a stand-alone application, or as a plug-in to another application, such as a browser or instant messaging client. In addition, the software may be distributed as a download or on a computer readable medium, such as a CD, or DVD. The rendering functionality according to the present invention can be incorporated into a variety of computing platforms, such as game boxes, handheld devices, and the like.

A. 3-Dimensional Portals on the 2-Dimensional Desktop

The invention, in one embodiment, establishes a system for combining 2-dimensional and 3-dimensional elements on the screen or desktop environment 10, as well as processing user input to these elements by weighting the projected transform of each element in 3-dimensional viewport space with a second viewport centered around the object's bounds, and the view distance normalized so that the object remains unclipped in the second viewport. The second viewport is spawned when an object's projection or local bounds crosses a clipping surface or 'portal' defined in the viewport of origin. For didactic purposes, FIG. 1 illustrates a desktop 10 including a viewport 12 according to one implementation of the present invention. As FIG. 1 illustrates, viewport 12 includes a 3-dimensional object 25 (here, a space ship) rendered therein. In one implementation, the user may effect movement of the object 25 within the viewport 12 using any suitable controls, such as a keyboard, joystick or mouse.

This clipping surface or portal within the 3-dimensional viewport 12 establishes a vector gradient that allows 3-dimensional objects to traverse seamlessly outside a 3-dimensional viewport 12 and into 2-dimensional desktop space 10. It also allows existing 2-dimensional elements on the user's desktop to move from 2-dimensional screen space into 3-dimensional viewport space. In one implementation, the 2-dimensional translation into 3-dimensional space occurs through the dragging and dropping (or other movement) of objects over a viewport as in traditional 2-dimensional desktop space, but with the added element of using the protruding depth of a viewport's clipping portal in 2-dimensional screen space, measured against a normalized depth factor applied to each 2-dimensional desktop element (or a depth factor stored for 3-dimensional elements), as an additional threshold for determining if an element can be moved from screen space into 3-dimensional viewport space. Dragging an asset across the screen from one folder or window into another, for example, normally performs the 'drop' into the active window beneath the cursor when the mouse button is released. The viewports managed by the rendering engine add to this process and further check whether the dragged asset passes through a viewport's 2-dimensional to 3-dimensional clipping surface portal plane. If the test passes, the viewport captures the element, and uses the screen to viewport translation described herein to link and position the file within the 3-dimensional scene of the viewport.

Based on the viewports described herein, a module of the rendering engine tracks the location of objects, such as object 25, relative to a clipping surface associated with a viewport 12. As discussed above (and as illustrated in FIGS. 2, 3 and 4), the viewports and rendering engine allow an object 25 rendered within the context of a first viewport 12, which may have visible borders for example, to jump out of a visible window and appear as a rendered 3-dimensional object within the context of the 2-dimensional desktop environment 10. Accordingly, in one implementation, the present invention provides a method comprising: defining a first viewport that comprises a rendering of a 3-dimensional object against a 2-dimensional plane from a first point of view; defining a threshold clipping surface within the context of the first viewport; when a given object rendered within the context of the first viewport crosses the threshold clipping surface, defining a second viewport that comprises a rendering of the 3-dimensional object against a 2-dimensional plane from a second point of view, wherein the second point of view changes dynamically with the movement of the object within the second viewport. In one implementation, immediately after the object crosses the clipping surface, the second point of view is set to the first point of view to create a seamless transition. Thereafter, the second point of view locations can be based on movement of the object (that is moving/or is being moved).

Alternatively, given two existing viewports, wherein at least one viewport includes a clipping surface, the rendering engine tracks the location of the rendered object relative to the clipping surface, and selectively renders in real time the object within the context of the first or second viewport based on the location of the object relative to the clipping surface. The clipping surface generally lies within, and is defined relative to, the physical space associated with a given viewport. A clipping surface can take a variety of forms, such as a sphere, a box, an arbitrarily-shaped volume or surface, a plane and the like. In one implementation, a clipping surface can be configured based on the specification of 8 points within the 3-dimensional space corresponding to a viewport. In one implementation, the clipping surface can be configured to approximate a view frustrum, outside of which rendering of objects generally does not occur. As discussed above, the present invention, in one implementation, allows a 3-dimensional object rendered within the context of a viewport including visible boundaries approximating a window, for example, to jump out of its boundary and into the 2-dimensional desktop environment, appearing nevertheless as a rendered 3-dimensional object.

In one implementation, the threshold clipping surface corresponds to the point of view in that, as the point of view changes (possibly by manipulation of interface controls by a user), one or more attributes of the threshold clipping surface may change as well. Furthermore, in one implementation, the location, shape, and orientation of the clipping surface is specified by a programmer as he/she deems necessary to achieve an intended effect. However, for didactic purposes, a typical clipping surface location is somewhere between the point of view and the 2-dimensional plane onto which the rendered object is projected. If the clipping plane is a 2-dimensional surface, for example, orientation of the clipping plane can be orthogonal to the point of view, or can be oriented parallel to the point of view. In addition, more than one clipping plane or surface can be defined within a given viewport, the crossing of which determines the resulting visual effect. In another implementation, however, the clipping surface may be statically defined relative to a global parameter system defining the background space against which selected 3-dimensional objects are rendered.

Figure 5B:
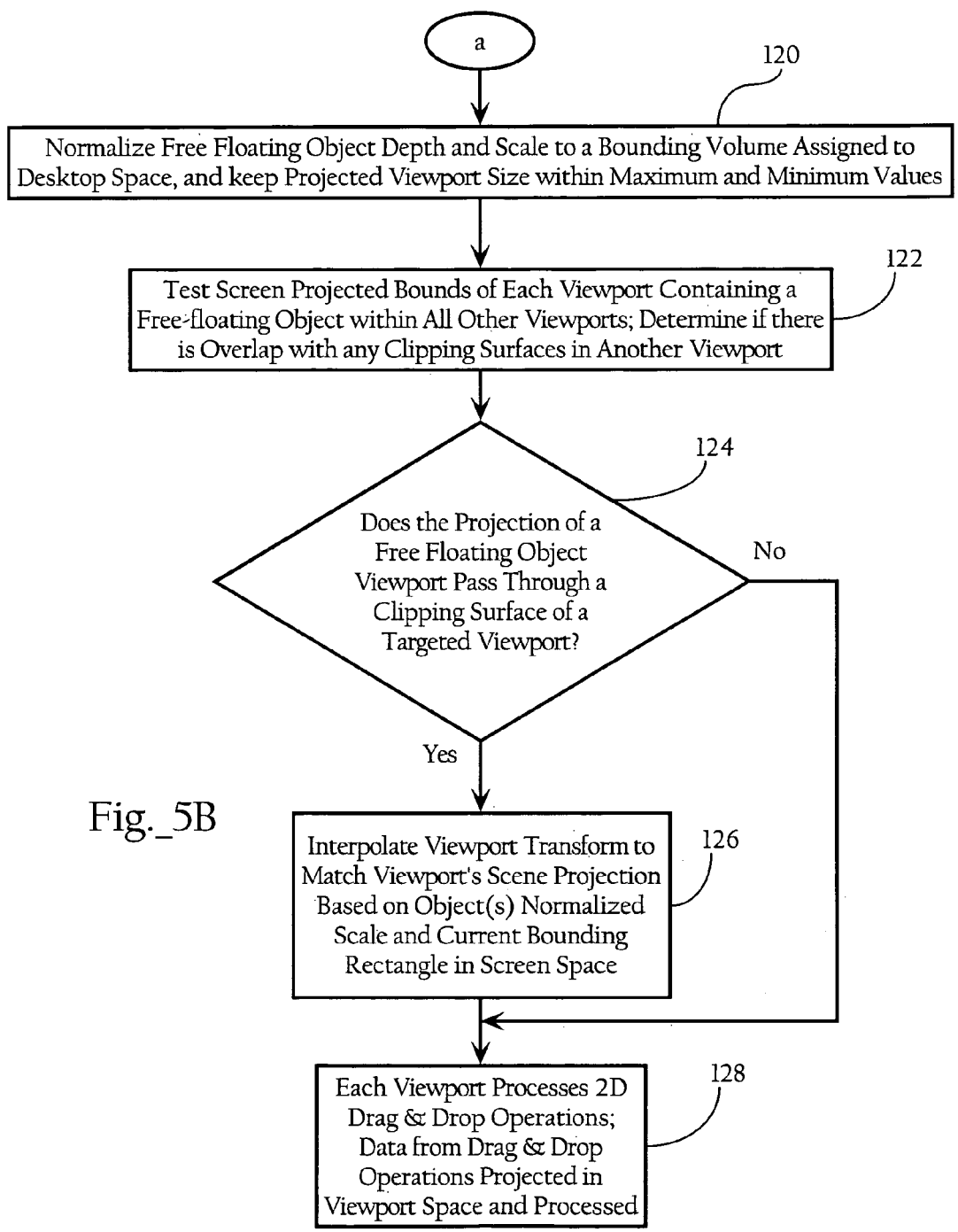

FIG. 5 (comprising FIGS. 5A & 5B) sets forth a method facilitating integration of a viewport and object rendered therein into a 2-dimensional space, such as a desktop environment. The method of FIG. 5 is a process executed continuously as the rendering engine refreshes the images rendered on the display. In one implementation, the refresh rate is 30 blits or frames per second or other refresh rate intended to achieve video or similar quality visual effects. As FIG. 5 illustrates, the rendering engine, in one implementation, maintains a table of all viewports and objects, and tracks which viewports each object is partially or fully linked to (102). The rendering engine applies transforms from user input or local motion to each object and viewport in their respective local space(s) (104), and adjusts the clipping surfaces within each viewport based on scene transforms and projected boundar(y)ies (106). The rendering engine then tests the last projected transform of each object against all clipping surfaces in the linked viewports (108). If the projected bounds of an object pass through a clipping surface in a linked viewport (110), the rendering engine moves the object into a newly created viewport and matches the new viewport projection to the viewport of origin (112). The rendering engine, in one implementation, also resizes new viewport bounds to prevent the object from being clipped when rendered (114), and centers the new viewport around the object in a fixed 2-dimensional rectangle as the new viewport bounds move further from the viewport of origin (116). The rendering engine then tests for user input on each viewport's screen projected border and handles, and repositions and rescales the viewport in 2-dimensional space if necessary (118). The rendering engine then normalizes the free floating object depth and scale to a bounding volume assigned to the desktop space and keeps the projected viewport size within a pre-assigned maximum and minimum value (120). Still further, the rendering engine tests the screen projected bounds of each viewport containing a free floating object within all other viewports, and determines whether there is overlap with any clipping surfaces in another viewport (122). If so (124), the viewport transform is interpolated to match the viewport's scene project based on the object's normalized scale and current bounding rectangle in screen space (126). Lastly, any 2-dimensional, or 3-dimensional, drag and drop operations are processed for each viewport and the data from the drop operation is projected into the viewport's 3-dimensional space and processed (128).

A.1. Rendering Engine, Viewport and Rendered Objects

The present invention, in one implementation, involves the use of, and extensions to, a three-dimensional rendering engine that projects a view of a 3-dimensional object onto a 2-dimensional plane (or other higher-order surface) having some arbitrarily defined boundary (called a viewport). As discussed more fully below, the viewport may have visible boundaries, discernable by the viewer/user, or invisible boundaries. As described herein (and as the Figures illustrate), the present invention, in one implementation, uses a combination of a first viewport having visible boundaries, and a second viewport having invisible boundaries to create the effect of having a rendered object jump from one viewport and appear as a rendered object within the context of the 2-dimensional or 3-dimensional desktop or other container surface environment. In one implementation, the 3-dimensional rendering engine operates within an application window of a desktop, making normal system calls to the underlying operating system to display the rendered, projected image in the application window. In other implementations, the 3-dimensional rendering engine may operate as a plug-in to a web browser, such as Microsoft® Internet Explorer®. In some implementations, the 3-dimensional rendering engine allows the user to select objects and change their location based on manipulation of a peripheral device, such as mouse, joystick, keyboard. A suitable 3-dimensional rendering engine, which can be extended according to the inventions described herein, is the 3-dimensional Groove rendering engine offered and distributed by Groove Alliance, Inc. of Hollywood, Calif. Of course, other 3-dimensional rendering engines can be used.

A.1.a. Master Screen Transform

In one implementation, the 3-dimensional rendering engine maintains a global screen transform (e.g., a 4×4 matrix) that represents a nearly orthogonal 2-dimensional viewspace of the display screen. This transform is used, in one implementation, to project 'free' 3-dimensional elements in a normalized scale form so that they can be tiled and grouped as similarly sized iconic representations in 2-dimensional desktop space.

A.1.b. Viewport Blitting

The 3-dimensional rendering engine, in one implementation, renders a viewport onto the desktop using a local set of off-screen buffers, or device resident graphics contexts or surfaces, and refreshes the viewport continuously as a normal 2-dimensional window, independently of the data rendered into the viewport's off-screen buffers. This allows a maximum number of viewports on screen at once, without requiring the rendering engine to continuously perform more expensive 3-dimensional rendering calculations if a given viewport is not in active use.

Most computer operating systems at the present time support alpha channel layer rendering to the screen through transparent windows and graphics contexts. Most operating systems at the present time do not support any kind of depth or W buffering for rendering. As the rendering engine, in one implementation, is intended to work as ubiquitously as possible, it maintains its own buffers for depth, normal, opacity and per-pixel 3-dimensional information for each viewport and object, internally performing all needed rastering until it is necessary to blit using whatever resources are available on the computing device. In the case of legacy systems (such as Microsoft® Windows® 98 platforms) that do not support opacity mapping directly on the desktop, the apparatus uses simple masking for transparency, and pulls in the pixels from the desktop image behind the view port and renders them into the off-screen buffer, simulating the effect of per pixel alpha blending on systems where this is not normally possible. Of course, the present invention can be applied to operating systems and display functionality that supports a variety of rendering, projection, masking and other graphics/display oriented technologies.

A.1.c. Viewport Clipping

As described herein, the rendering engine, in one implementation, renders 3-dimensional objects against a 2-dimensional projection within a viewport that comprises a transparent window, and applies masking or other techniques to give the visual effect that the one or more desired objects are the only visible things rendered on top of the desktop environment. In one implementation, the rendering engine renders a desired object within a rectangular window against a background of a solid color. Then, using one of two alternative methodologies, cleans up the portions of the window over which the rendered object does not extend. For example, the rendering engine uses operating systems calls to instruct that certain colors (i.e., the color chosen for the solid background) should not be rendered, allowing images and colors displayed in the background of the desktop environment to be displayed. In another implementation, the rendering engine generates a mask defining the outline of the rendered object. The mask defines the regions of transparency and their intensity on a per-pixel basis. Accordingly, the rendering engine uses operating system calls and the mask to define intensity of transparency for pixels surrounding the rendered object in desktop display.

Furthermore, the transparent window can be sized and moved around the desktop space as necessary to fit the rendered object and to accommodate its current location and displacement as the object moves or is moved. Alternatively, the transparent window can be co-extensive with the desktop space (or some arbitrarily defined space) and the object can be moved around within it (without moving the transparent window relative to the desktop).

Borderless Viewports

As described above, each viewport contains its own depth information, allowing the rendering engine to build an opacity map for the viewport's next blit to the screen based on the viewport's depth buffer. Thus a blitted pixel's alpha value can be volumetrically pre-calculated, based an on it's depth in the viewport and optionally combined with a 2-dimensional opacity map also applied to the viewport. Elements outside the rendering engine's process (such as a normal desktop window) that are captured by the rendering engine are assigned a depth value. Using this method, a procedurally generated volume with depth information, such as a 3-dimensional sphere, ellipse, perlin fractally noise generated spatial field or voxel array can be used to clip a viewport's projected pixels as the viewport projection changes, and an additional 2-dimensional alpha channel map containing a gradient border can be multiplied against the resulting opacity map to make sure that the pixels in the viewport are clipped in both 3-dimensional viewport and 2-dimensional screen space.

Bordered Viewports

Viewports can also be rendered with a border that appears and acts like a traditional 2-dimensional window frame border (when aligned to face the camera). In one implementation, the border is rendered over the 3-dimensional viewport as a separate 3-dimensional object with its own transform. It thus can visually clip the viewport's rendered contents to a projected portal. The border also contains hotspots (which can be mirrored by arbitrary polygons in the 3-dimensional viewport scene as well) to resize and move the window in orthogonal 2-dimensional screen space on the desktop, and scroll bars that shift the position of the projected screen displayed by the viewport. The border, by default, represents a masking portal for the viewport where 2-dimensional screen space is merged into 3-dimensional space. While a borderless viewport can use its opacity depth to determine the transition weight between 3-dimensional space and 2-dimensional space, a border viewport defines a marked clipping plane for a portal between the two.

As with any draggable screen element from the desktop, a viewport in screen space can be moved over and into another viewport on the screen, and its 2-dimensional screen aligned view will be gradated into a projection in the parent viewport's local 3-dimensional space.

A viewport border also contains additional regions on its surface that allow the user to reorient the frame along the X, Y or Z axis and move the entire viewport closer or further into the screen against the layers of 2-dimensional desktop elements, and other 3-dimensional viewports and objects managed by the apparatus.

Viewports can be dragged by their borders in 2-dimensional screen space using the border's scroll bars and grow box operated along the border's axis of orientation. Because the border transform is maintained separately from the viewport's scene transform, the tilting of a viewport's border frame can quickly allow a user to change the vector of the scroll bars' effect on the viewport. For example, if the viewport represents a ground level scene looking to the horizon, moving the vertical scroll bar will move the view up or down in altitude. The same scroll bar, when the viewport frame is tilted along the horizontal screen axis, would be projecting into the screen, and moving the scroll bar up would then move the view along the ground, rather than up into the sky.

An additional button can lock the viewport border's transform to the viewport scene's transform, so that when the border is moved or tilted, the viewport's scene transform is automatically transformed as well, not just masked within the border's new area.

B. Shared Viewports

In one implementation, elements maintained and rendered by the rendering engine on a local client can be transmitted and rendered remotely onto other clients. Through a standard TCP/IP or other network protocol connection, two or more clients can be linked to a shared virtual viewport, with each client viewing and interacting through the shared viewport space from the perspective of their viewport transform on their local machine. 3-Dimensional objects from a client's local system can be moved into the shared viewport space from local desktop space, as described above, with the apparatus on each client updating and rendering the scene from the perspective of the client's view into the scene. This allows existing desktop elements on the local machine to be projected to a remote client through the mechanism of a shared viewport. For example, if the shared viewport contains a 3-dimensional lake which the apparatus is rendering for both clients, one client can tilt their perspective into the shared scene towards a floating element on their desktop, and the lake water will reflect the local object on the rendered water of both the local and remote client, thus 'bouncing' its reflection to a remote client. In a more direct manner, a city block can serve as a shared space between clients, with the one client dragging files from a normal system folder and placing them on the sidewalk, where a remote client can view them in the context of the scene within their viewport, and drag or copy them from the shared viewport space into a local folder.

Using the following method, this apparatus can establish a shared viewport on a remote client, with just a few clicks from the remote user, even if it does not yet have the rendering engine installed before a first connection is established. Using an IM gateway (such as a TOC socket connection, or server IM proxy) built into the apparatus, it sends a single URL link to the remote client in an IM. The sent link is interpreted by an automated web server when the remote client clicks on it. The server generates an HTML file and sends it to the remote client. The HTML received by the remote client first downloads a stub web browser plug-in which transparently installs the apparatus and uses the server generated HTML parameters passed to the browser plug-in to establish a shared viewport between each client.

This allows the viral dissemination of both the rendering engine runtime code and its managed content with almost no installation or action required on the part of the remote user (one to click on the link sent in an IM, the other to accept the installation of the apparatus' browser plug-in, which can take the form of a stub ActiveX control on a PC, or a QuickTime component or Shockwave Xtra on the Mac).

The apparatus when first installed from a web page link (as described above) or in executable form, will allow users to sign into their IM account (using public IM protocols like TOC, or a server based IM gateway for protected protocols), subsequently creating a 3-dimensional object on the screen for each contact on the users' buddy lists. These buddy objects represent remote clients, and when moved to local a viewport by a user, make that viewports shared between the clients (spawning a new viewport on the remote client if the shared scene is not already attached to a viewport on the remote client's machine).

C. Exemplary Computing Platform

Figure 6:
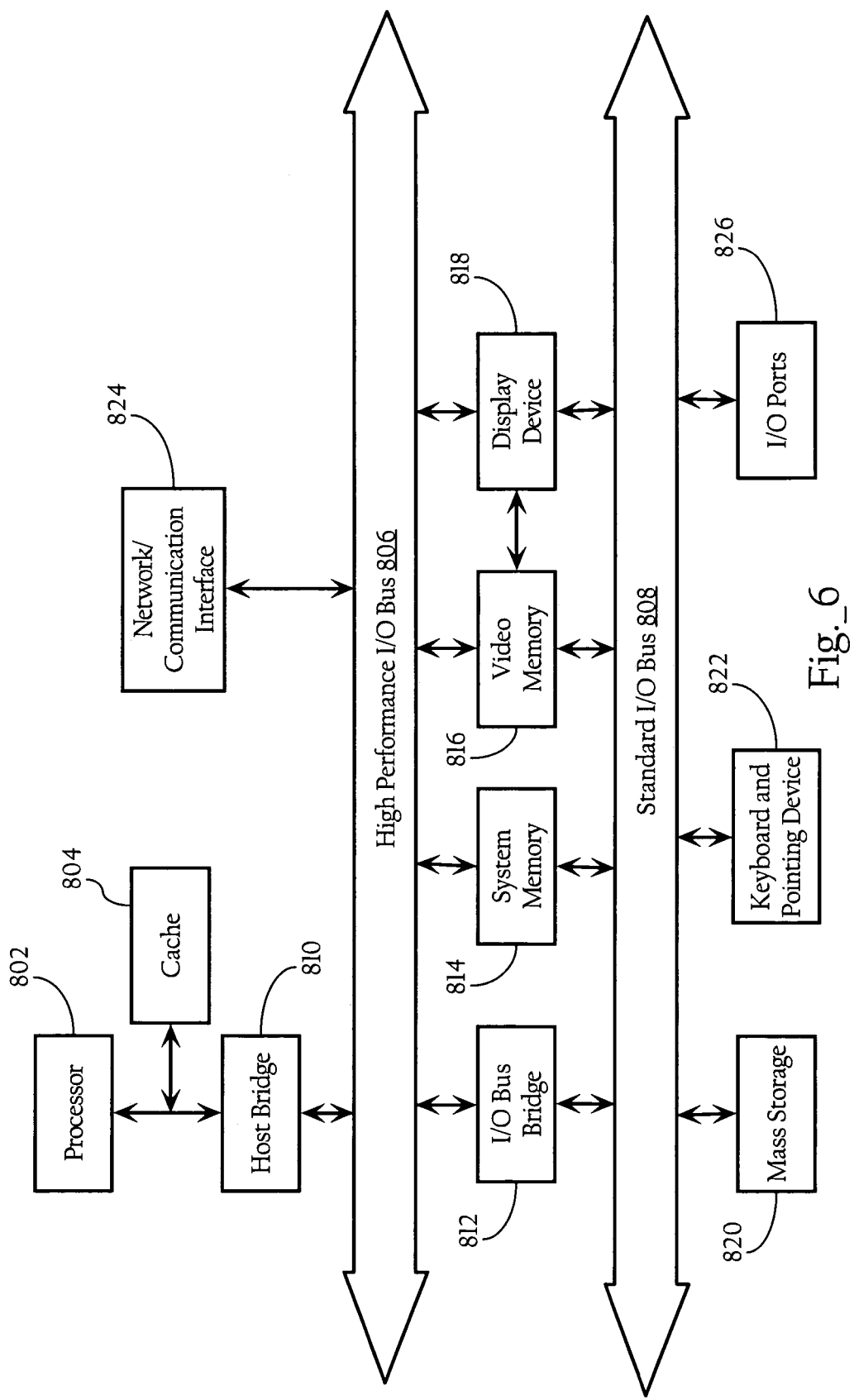
FIG. 6 is a functional block diagram setting forth one possible system architecture for a general purpose computer on which embodiments of the present invention may be executed.

Still further, in the embodiments described above, the present invention is executed within the context of a software application installed on a general purpose computer. FIG. 6 illustrates, for didactic purposes, the system architecture of a general purpose computer according to one implementation of the present invention. The present invention, however, can be implemented on a wide variety of computer system architectures. In one embodiment, the above-described system architecture operates in connection with computer hardware system 800 of FIG. 6. An operating system manages and controls the operation of system 800, including the input and output of data to and from the location diagram editing application, as well as other software applications (not shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 6 illustrates one embodiment of a computer hardware system suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are network/communication interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, network/communication interface 824 is used to provide communication between system 800 and any of a wide range of conventional networks, such as an Ethernet network, a wireless (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

In one embodiment, the operations of the location diagram editing application are implemented as a series of software routines run by hardware system 800 of FIG. 6. These software routines comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802. In one implementation, these software routines are written in the C++ programming language and stored in compiled form on mass storage device 820. However, these routines may be implemented in any of a wide variety of programming languages, including Visual Basic, Java, etc. In alternate embodiments, the present invention is implemented in discrete hardware or firmware. For example, an application specific integrated circuit (ASIC) could be programmed with the above described functions of the present invention.

The invention has been explained with reference to specific embodiments. For example, the rendering engine and associated functionality can be implemented on a variety of computing platforms, such as dedicated gaming devices or boxes, handheld devices and the like. In addition, the present invention can also be implemented within the context of operating systems that support 3-dimensional desktop or other display environments and windows. In such cases, the present invention can be used to allow objects rendered in a given viewport to escape that viewport and be rendered against the context of the 3-dimensional desktop. Other embodiments will be evident to those of ordinary skill in the art. It is therefore not intended that the invention be limited except as indicated by the appended claims.

What is claimed is:

1. A method for rendering three-dimensional objects within the context of a display environment, comprising:
 defining a first viewport on a display that comprises a rendering of a 3-dimensional object against a 2-dimensional plane from a first point of view;
 defining a threshold clipping surface within the context of the first viewport;
 when the 3-dimensional object rendered within the context of the first viewport crosses the threshold clipping surface, defining a second viewport that comprises a rendering of the 3-dimensional object against a 2-dimensional plane from a second point of view, wherein the second point of view changes dynamically with the movement of the object within the second viewport; and
 wherein the second point of view is set to the first point of view when the 3-dimensional object crosses the threshold clipping surface.

2. The method of claim 1 wherein the threshold clipping surface is a plane.

3. The method of claim 1 wherein the threshold clipping surface is a three-dimensional surface.

4. The method of claim 1 wherein the first viewport comprises a visible boundary.

5. The method of claim 1 wherein the 3-dimensional object is centered within the second viewport.

6. A method for rendering three-dimensional objects within the context of a display environment, comprising:
 defining a first viewport on a display that comprises a rendering of a 3-dimensional object against a 2-dimensional plane from a first point of view;
 defining a threshold clipping surface within the context of the first viewport;
 when the 3-dimensional object rendered within the context of the first viewport crosses the threshold clipping surface, defining a second viewport that comprises a rendering of the 3-dimensional object against a 2-dimensional plane from a second point of view, wherein the second point of view changes dynamically with the movement of the object within the second viewport; and wherein the defining the first viewport comprises rendering the first viewport in a buffer and blitting the buffered viewport to the display.

7. The method of claim 1 wherein the second viewport is defined as a borderless window having a transparent background through which elements of the underlying display are visible.

8. An apparatus for rendering three-dimensional objects within the context of a display environment, comprising:
   a processor;
   a memory;
   a software application, physically stored in the memory, comprising instructions operable to cause the processor and the apparatus to:
   define a first viewport on a display that comprises a rendering of a 3-dimensional object against a 2-dimensional plane from a first point of view;
   define a threshold clipping surface within the context of the first viewport;
   define, when the 3-dimensional object rendered within the context of the first viewport crosses the threshold clipping surface, a second viewport that comprises a rendering of the 3-dimensional object against a 2-dimensional plane from a second point of view;
   change the second point of view dynamically with the movement of the object within the second viewport; and
   wherein the second point of view is set to the first point of view when the 3-dimensional object crosses the threshold clipping surface.

9. The apparatus of claim 8 wherein the threshold clipping surface is a plane.

10. The apparatus of claim 8 wherein the threshold clipping surface is a three-dimensional surface.

11. The apparatus of claim 8 wherein the first viewport comprises a visible boundary.

12. The apparatus of claim 8 wherein the 3-dimensional object is centered within the second viewport.

13. An apparatus for rendering three-dimensional objects within the context of a display environment, comprising:
   a processor;
   a memory;
   a software application, physically stored in the memory, comprising instructions operable to cause the processor and the apparatus to:
   define a first viewport on a display that comprises a rendering of a 3-dimensional object against a 2-dimensional plane from a first point of view;
   define a threshold clipping surface within the context of the first viewport;
   define, when the 3-dimensional object rendered within the context of the first viewport crosses the threshold clipping surface, a second viewport that comprises a rendering of the 3-dimensional object against a 2-dimensional plane from a second point of view;
   change the second point of view dynamically with the movement of the object within the second viewport; and
   wherein to define the first viewport the software application further comprises instructions operative to cause the processor to render the first viewport in a buffer located in the memory and blit the buffered viewport to the display.

14. A computer-readable medium storing executable instructions which, when executed by a computing system, causes the computing system to:
   define a first viewport on a display that comprises a rendering of a 3-dimensional object against a 2-dimensional plane from a first point of view;
   define a threshold clipping surface within the context of the first viewport;
   define, when the 3-dimensional object rendered within the context of the first viewport crosses the threshold clipping surface, a second viewport that comprises a rendering of the 3-dimensional object against a 2-dimensional plane from a second point of view,
   change the second point of view dynamically with the movement of the object within the second viewport; and
   wherein the second point of view is set to the first point of view when the 3-dimensional object crosses the threshold clipping surface.

15. The computer readable medium of claim 14 wherein the first viewport comprises a visible boundary.

16. The computer readable medium of claim 14 wherein the second viewport is defined as a borderless window having a transparent background through which elements of the underlying display are visible.

* * * * *